US007189038B2

(12) United States Patent
Stuxberg et al.

(10) Patent No.: US 7,189,038 B2
(45) Date of Patent: Mar. 13, 2007

(54) ORBITAL MACHINING APPARATUS WITH DRIVE ELEMENT WITH DRIVE PINS

(75) Inventors: Mats Stuxberg, Sollentuna (SE); Björn Pettersson, Järfälla (SE)

(73) Assignee: Novator AB, Spanga (SE)

( * ) Notice: Subject to any disclaimer, the term of this patent is extended or adjusted under 35 U.S.C. 154(b) by 0 days.

(21) Appl. No.: 10/562,614

(22) PCT Filed: Jun. 28, 2004

(86) PCT No.: PCT/SE2004/001036

§ 371 (c)(1),
(2), (4) Date: Mar. 3, 2006

(87) PCT Pub. No.: WO2004/113002

PCT Pub. Date: Dec. 29, 2004

(65) Prior Publication Data

US 2006/0198710 A1   Sep. 7, 2006

Related U.S. Application Data

(60) Provisional application No. 60/481,026, filed on Jun. 26, 2003.

(51) Int. Cl.
*B23C 1/00* (2006.01)
(52) U.S. Cl. .................. 409/200; 409/74; 409/232; 464/102
(58) Field of Classification Search .......... 409/74, 409/143, 191, 200, 231, 232; 408/124, 129, 408/131; 82/1.2–1.4; 464/102, 104, 125, 464/126
See application file for complete search history.

(56) References Cited

U.S. PATENT DOCUMENTS

| 3,803,981 | A | * | 4/1974 | Allgeyer ............... 409/193 |
| 4,423,991 | A | * | 1/1984 | Derr, Jr. ............... 409/200 |
| 4,934,040 | A | | 6/1990 | Turchan |
| 5,536,152 | A | | 7/1996 | Kawahara et al. |
| RE36,053 | E | * | 1/1999 | Bush et al. ............... 464/102 |
| 5,971,678 | A | | 10/1999 | Linderholm |
| 6,135,737 | A | * | 10/2000 | Miura et al. ............... 464/102 |
| 6,663,327 | B2 | | 12/2003 | Linderholm et al. |
| 6,719,505 | B2 | * | 4/2004 | Linderholm et al. ........ 409/200 |
| 6,758,642 | B2 | * | 7/2004 | Linderholm et al. ........ 409/191 |
| 2003/0113181 | A1 | * | 6/2003 | Linderholm et al. ........ 409/200 |

* cited by examiner

*Primary Examiner*—Erica Cadugan
(74) *Attorney, Agent, or Firm*—Taylor & Aust, P.C.

(57) ABSTRACT

An orbital machining apparatus for producing a workpiece hole with a cutting tool, including: a first actuator for rotating the tool about its longitudinal center axis during the machining of the hole; a second actuator for moving the tool in an axial feed direction substantially parallel to the tool axis; a third actuator for rotating the cutting tool about a principal axis; and a radial offset mechanism. The third actuator includes a rotating drive driven by a motor, a carrier ring connected to and rotated by the drive by two opposed, radial drive pins. The ring performs a radial sliding movement relative to the drive while being rotated thereby. Two opposed, radial carrier guide shafts circumferentially spaced 90° from the drive pins and connecting the ring and an inner cylindrical eccentric body such that the latter may perform a radial sliding movement relative to the ring while being rotated thereby.

3 Claims, 4 Drawing Sheets

ORBITAL MACHINING APPARATUS WITH DRIVE ELEMENT WITH DRIVE PINS

The present application is the national stage of PCT/SE04/01036, filed Jun. 28, 2004, which claims benefit of U.S. provisional application 60/481,026, filed Jun. 26, 2003.

BACKGROUND OF THE INVENTION

1. Field of the Invention

The present invention relates to an orbital machining apparatus for producing a hole in a workpiece by way of a cutting tool rotating about its own tool axis as well as eccentrically (orbiting) about a principal axis corresponding to the longitudinal center axis of the hole to be machined. More particularly, the present invention relates to an improved mechanism of an apparatus for transferring a rotational movement to an inner eccentric cylindrical body of a mechanism for adjusting the radial offset (orbit radius) of the cutting tool axis relative to the principal axis.

2. Description of the Related Art

WO 03/008136 A1 discloses an orbital machining apparatus for producing a hole in a workpiece by way of a cutting tool. The apparatus includes a first actuator configured for rotating the cutting tool about its longitudinal center axis during the machining of the hole. A second actuator is configured for moving the cutting tool in an axial feed direction substantially parallel to the tool axis, the second actuator being simultaneously operable with the first actuator. A third actuator is configured for rotating the cutting tool about a principal axis, the principal axis is substantially parallel to the center axis of the tool and coaxial with a longitudinal center axis of the hole to be machined. The third actuator is simultaneously operable with the first and second actuators. A radial offset mechanism is configured for controlling the radial distance of the center axis of the cutting tool from the principal axis, the radial offset mechanism includes an inner cylindrical body having an eccentric cylindrical hole. The eccentric hole has a longitudinal center axis that is parallel to and radially offset from a longitudinal center axis of the inner body. The eccentric hole is configured to radially and rotatably support a spindle unit for operating the cutting tool. An outer cylindrical body has an eccentric cylindrical hole. The eccentric hole of the outer body has a longitudinal center axis that is parallel to and radially offset from a longitudinal center axis of the outer body. The inner cylindrical body is radially supported in the eccentric hole of the outer cylindrical body and rotatable therein so as to allow for adjustment of the radial distance of the center axis of the cutting tool from the principal axis. The third actuator includes a first motor drivingly connected to the outer cylindrical body for individually rotating the latter about the longitudinal center axis thereof, and a second motor drivingly connected to the inner cylindrical body for individually rotating the latter about the longitudinal center axis thereof. The first and second motors are configured to rotate the outer and inner cylindrical bodies in synchronism to maintain a mutual rotary position thereof so as to keep the radial offset position of the cutting tool unchanged during a working operation.

The first and second motors are also configured to rotate the outer and inner cylindrical bodies in different angular speeds so as to vary the radial offset position of the cutting tool. Thus, two separate motors and the transmissions are configured for rotating the outer and inner cylindrical bodies either in synchronism (=no mutual rotation) during a working operation to maintain a predetermined mutual rotary position of the cylindrical bodies and thereby a predetermined radial offset (for making a cylindrical hole or recess in a workpiece), or in different angular speeds (mutual rotation) to vary the radial offset either during a working operation (e.g. for making a conical hole or recess) or during a non-working phase to adjust the radial offset to another desired radial offset value.

The transmission or mechanism for transferring a rotational movement from the second motor to the inner cylindrical body includes a coupling, which is configured for allowing the inner cylindrical body to perform an orbital movement about the principal axis while not rotating about its own center axis relative to the outer cylindrical body. The coupling also permits the inner cylindrical body to be rotated about its center axis relative to the outer cylindrical body by the second motor so as to vary the radial offset either during a working operation or during a non-working phase to adjust the radial offset to another desired radial offset value. This coupling comprises a fork-and-cam roller mechanism.

A problem related to the fork-and-cam roller mechanism is that the contact surface of the cam roller wears with time and creates a play, which affects the degree of precision of the coupling mechanism and thus of the working process of the orbital machining apparatus.

SUMMARY OF THE INVENTION

The present invention provides an orbital machining apparatus having a coupling arrangement which maintains the degree of precision of the coupling mechanism and the working process.

The invention comprises, in one form thereof, a first actuator configured for rotating the cutting tool about its longitudinal center axis during the machining of the hole; and a second actuator configured for moving the cutting tool in an axial feed direction substantially parallel to the tool axis, the second actuator being simultaneously operable with said first actuator. A third actuator is configured for rotating the cutting tool about a principal axis, the principal axis being substantially parallel to the center axis of the tool and coaxial with a longitudinal center axis of the hole to be machined. The third actuator is simultaneously operable with the first and second actuators. A radial offset mechanism is configured for controlling the radial distance of the center axis of the cutting tool from the principal axis, the radial offset mechanism includes an inner cylindrical body having an eccentric cylindrical hole, the eccentric hole has a longitudinal center axis that is parallel to and radially offset from a longitudinal center axis of the inner body. The eccentric hole is configured to radially and rotatably support a spindle unit for operating the cutting tool. An outer cylindrical body having an eccentric cylindrical hole. The eccentric hole of the outer body has a longitudinal center axis that is parallel to and radially offset from a longitudinal center axis of the outer body. The inner cylindrical body is radially supported in the eccentric hole of the outer cylindrical body and rotatable therein so as to allow for adjustment of the radial distance of the center axis of the cutting tool from the principal axis. The third actuator includes a first motor drivingly connected to the outer cylindrical body for individually rotating the latter about the longitudinal center axis thereof. A second motor is drivingly connected to the inner cylindrical body for individually rotating the latter about the longitudinal center axis thereof. The first and second motors being configured to rotate the outer and inner cylindrical bodies in synchronism to maintain a mutual rotary position thereof so as to keep the radial offset position of the cutting tool unchanged during a working operation. The first and second motors being further configured to rotate the cylindrical bodies relative to each other so as to vary the radial offset position of the cutting tool. The third actuator further includes a first rotating drive element coaxial to the outer cylindrical body and driven by the first motor, and a second rotating drive element coaxial to the outer cylindrical body and rotated by the second motor. According to the present invention the second drive element is rotatably connected to a carrier ring by way of two diametrically opposed, radial drive pins such that the carrier ring may perform a radial sliding movement along the longitudinal axis of the drive pins relative to the second drive element while being rotated thereby. The carrier ring is connected to the inner cylindrical body by way of two diametrically opposed, radial carrier guide shafts, which are circumferentially spaced 90° from the drive pins, such that the inner cylindrical body may perform a radial sliding movement relative to the carrier ring while being rotated thereby.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
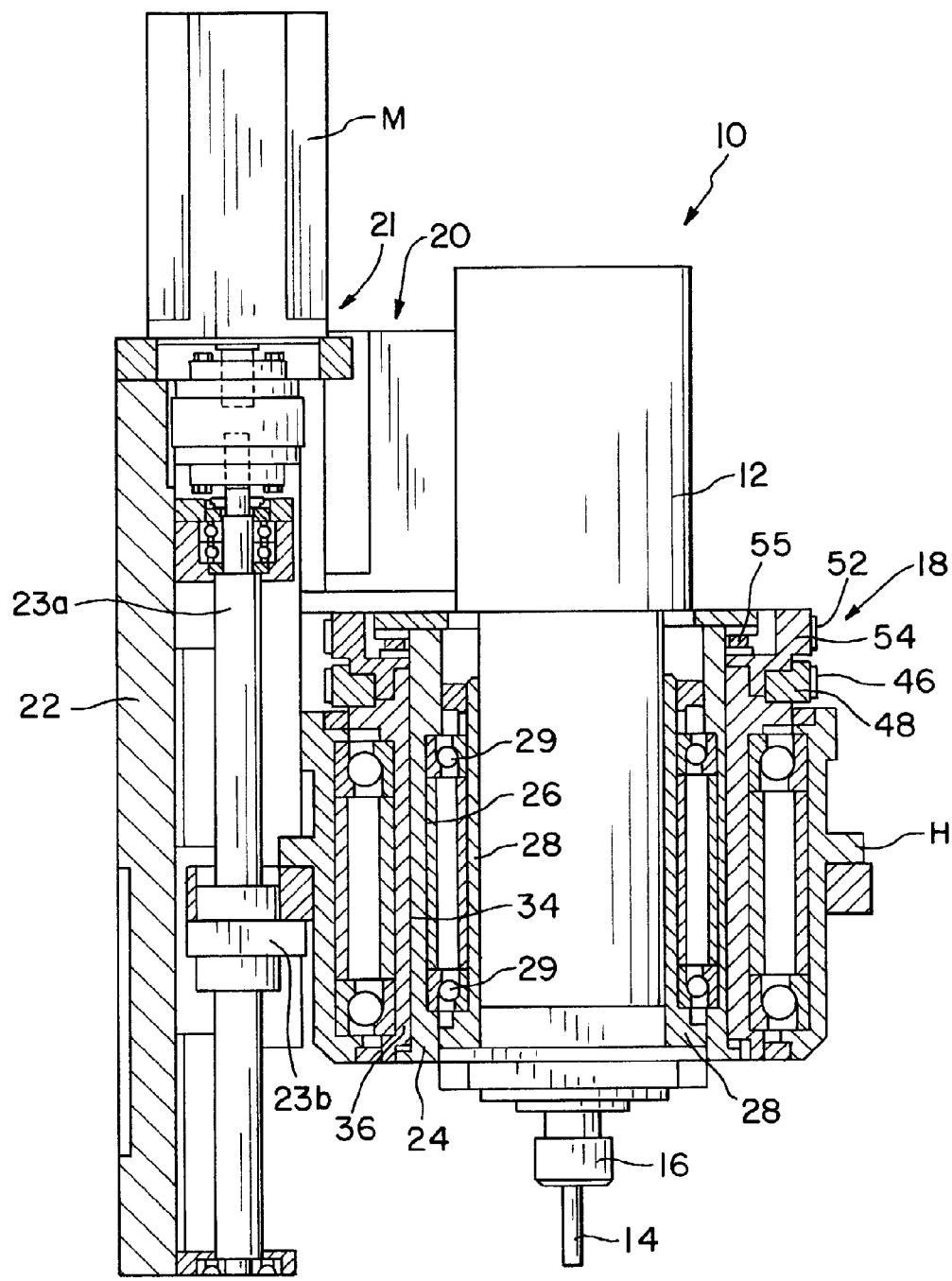
FIG. 1 is a schematic side cross-sectional view of a previously known orbital machining apparatus having many components in common with the apparatus of the present invention.
Figure 2:
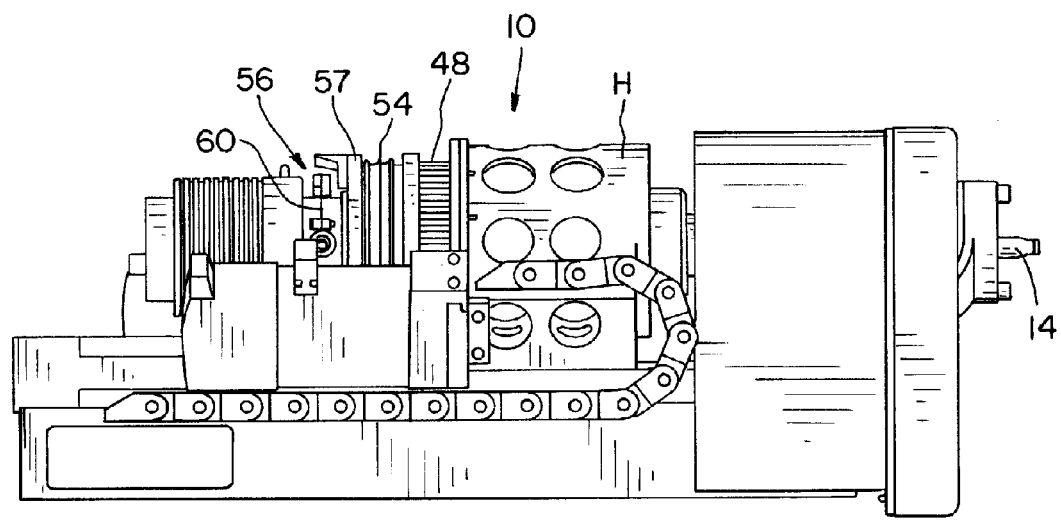
FIG. 2 is a side view of an embodiment of an orbital machining apparatus of the present invention.
Figure 3:
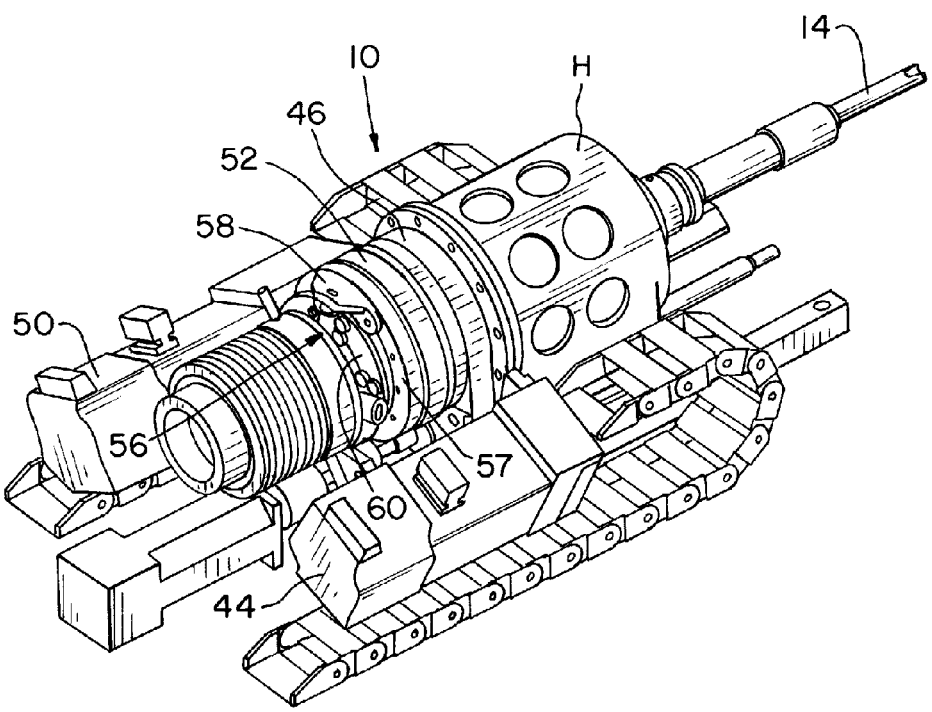
FIG. 3 is a perspective view of the orbital machining apparatus of the present invention.
Figure 4:
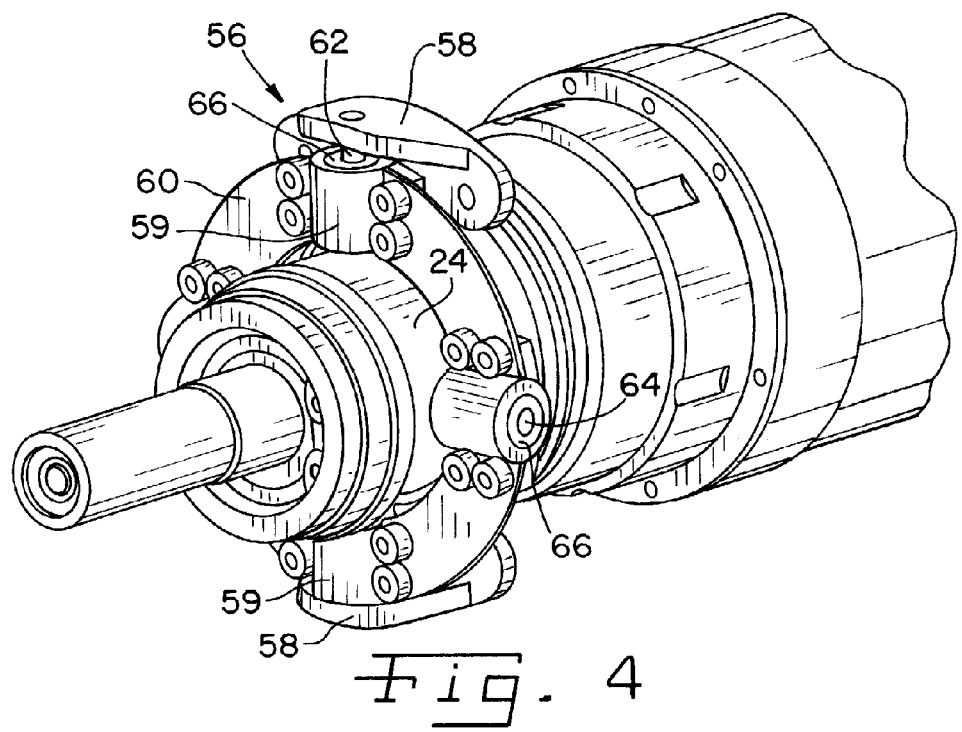
FIG. 4 is an enlarged perspective view of a coupling arrangement for rotating an inner cylindrical eccentric body according to the present invention.
Figure 5:
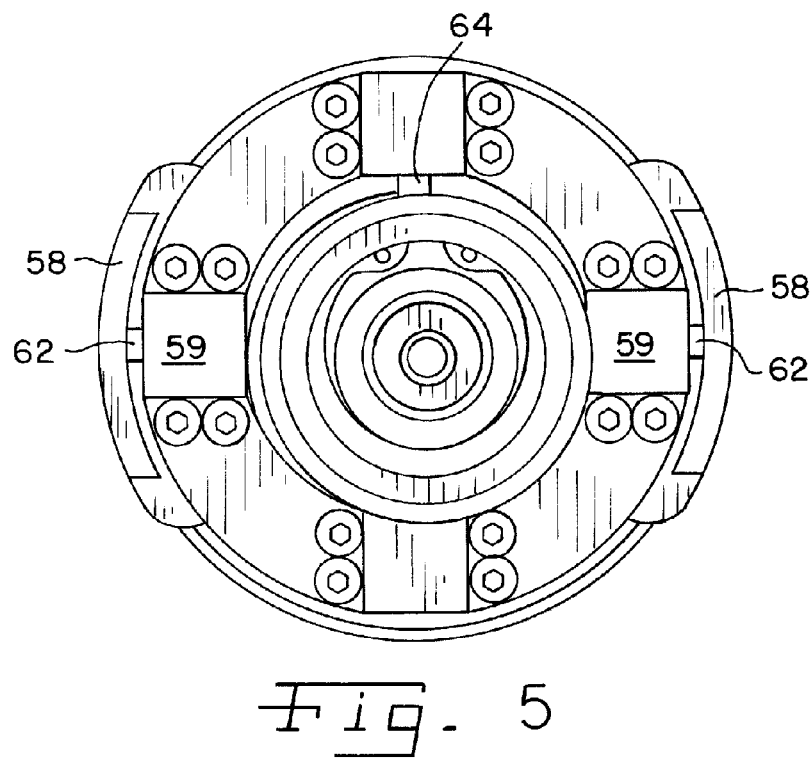
FIG. 5 is an end view of the coupling arrangement in FIG. 4.
Figure 6:
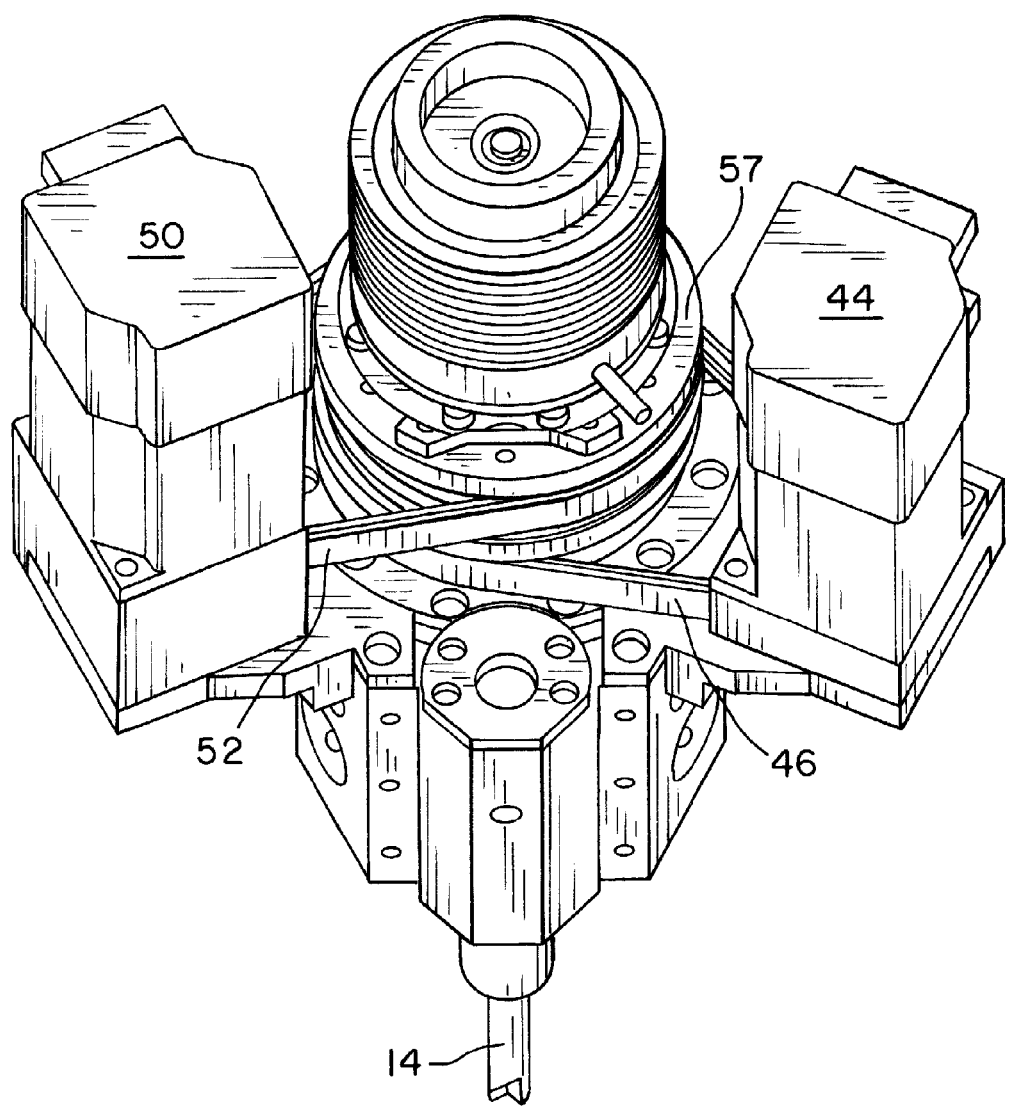
FIG. 6 is a perspective view from behind of the apparatus of the invention.

Referring now to the drawings, and more particularly to FIG. 1, a conventional orbital machining apparatus 10 generally includes a spindle motor unit 12 that rotates a cutting tool 14 about its own axis 16, a radial offset mechanism 18, an eccentric rotation mechanism 20 and an axial feed mechanism 21. Apparatus 10 may be slideably mounted to a stationary stand 22 or mounted to a movable member, such as a robot arm (not shown). Axial feed mechanism 21 includes a stationary motor M which drives a ball screw 23a engaging a ball nut 23b fixedly secured to a machine housing H.

As shown in FIG. 1, radial offset mechanism 18 includes an inner hollow cylindrical body 24 rotatably supporting spindle motor unit 12 therein. Spindle motor unit 12 is rotatably supported in an eccentric cylindrical hole 26 of inner cylindrical body 24 via a fixation sleeve 28 and bearings 29. Eccentric hole 26 has a longitudinal center axis that is parallel to but radially offset a distance from the longitudinal center axis of inner cylindrical body 24.

Eccentric inner cylindrical body 24 is, in its turn, rotatably supported within an axially extending eccentric hole 34 of a second, outer hollow cylindrical body 36. Eccentric hole 34 has a longitudinal center axis that is parallel to but radially offset a distance from the center axis of outer cylindrical body 36 (the principal axis). Preferably, holes 26 and 34 of cylindrical bodies 24 and 36 have the same eccentricity, i.e. the hole center axes are radially offset the same distance from the respective center axis of bodies 24 and 36. By rotating inner cylindrical body 24 within eccentric hole 34 of outer cylindrical body 36, or by a mutual, relative rotation of cylindrical bodies 24 and 36, it is thus possible to locate the center axis of eccentric hole 26 of inner cylindrical body 24 such that it, and hence spindle motor unit 12 and center axis 16 of cutting tool 14, coincides with the center axis of outer cylindrical body 36. In this case there is no radial offset at all of cutting tool axis 16. By performing a mutual, relative rotation of 180° of the inner and outer cylindrical bodies 24 and 36 away from this zero radial offset position, a maximum offset of cutting tool axis 16 is obtained.

Basically, outer cylindrical body 36 is rotatably supported in the housing H of apparatus 10 and is rotatable by a motor (not shown) via a belt 46, which engages a belt wheel 48 connected to outer body 36. Likewise, inner cylindrical body 24 is rotatable by a further motor via a belt 52, which engages a belt wheel 54 connected to inner body 24 via a coupling 55 including a fork-and-cam roller mechanism. Belt wheel 54 is arranged to rotate in a concentric position relative to belt wheel 48. Coupling 55 is configured for allowing inner cylindrical body 24 to perform an orbital movement about the principal axis while not rotating about its own center axis relative to outer cylindrical body 36. This coupling 55 also permits inner cylindrical body 24 to be rotated about its center axis relative to outer cylindrical body 36 by the further motor so as to vary the radial offset either during a working operation or during a non-working phase to adjust the radial offset to another desired radial offset value.

As shown in FIGS. 2–5, the present invention provides a new coupling 56 for rotating inner cylindrical body 24 relative to outer cylindrical body 36. The same reference numerals are used here for components corresponding to those in FIG. 1. Belt wheel 54, which is driven by a motor 50 and belt 52, is connected to a drive element 57 in shape of a yoke having two diametrically opposed, axially extending lugs 58. A flat carrier ring 60 is located radially inside of lugs 58 and is connected to and rotated by drive element 57 by way of two diametrically opposed, radial drive pins 62 which extend inwardly from lugs 58 and are slidably mounted in diametrically opposed sleeves 59 fixated to carrier ring 60 such that carrier ring 60 may perform a radial sliding movement along the longitudinal axis of drive pins 62 relative to drive element 57 while being rotated thereby. Furthermore, two diametrically opposed, radial carrier guide shafts 64, which are circumferentially spaced 90° from drive pins 62, connect carrier ring 60 and inner cylindrical body 24 such that the latter may perform a radial sliding movement along the longitudinal axis of guide shafts 64 relative to carrier ring 60 while being rotated thereby. Drive pins 62 and guide shafts 64 are snugly received in respective linear bearings 66 located in carrier ring 60.

When belt wheels 48 and 54 are rotated with the same angular speed during a working operation, cylindrical bodies 36, 24 are rotated in synchronism by their respective motors 44, 50 and belts 46, 52. This denotes that no change of the radial offset value of tool axis 16 occurs. In combination with an axial feed of cutting tool 14 into the workpiece (not shown) a cylindrical hole or recess may then be formed therein.

If the inner and outer cylinder bodies 24 and 36 are caused to perform a relative rotation by rotating belt wheels 54 and 48 in different angular speeds, the radial offset value of cutting tool axis 16 is changed. This makes it possible to form a conical or tapered hole or a conical or curved section or recess in the workpiece when combined with an axial feed of cutting tool 14 into the workpiece. The adjustment of the radial offset may also be done during a non-working phase or during a stop of the axial feed of the cutting tool.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An orbital machining apparatus for producing a hole in a workpiece by way of a cutting tool, said apparatus comprising:
    a first actuator configured for rotating the cutting tool about a cutting tool longitudinal center axis during a machining of the hole;
    a second actuator configured for moving the cutting tool in an axial feed direction substantially parallel to said cutting tool longitudinal center axis, said second actuator being simultaneously operable with said first actuator;
    a third actuator configured for rotating the cutting tool about a principal axis, said principal axis being substantially parallel to said cutting tool longitudinal center axis of the tool and coaxial with a longitudinal center axis of the hole to be machined, said third actuator being simultaneously operable with said first actuator and second actuator; and
    a radial offset mechanism configured for controlling a radial distance of said cutting tool longitudinal center axis of the cutting tool from said principal axis, said radial offset mechanism including:
        an inner cylindrical body having a first eccentric cylindrical hole, said first eccentric hole having a first eccentric hole longitudinal center axis that is parallel to and radially offset from a longitudinal center axis of said inner cylindrical body, said first eccentric hole being configured to radially and rotatably support a spindle unit for operating said cutting tool; and
        an outer cylindrical body having a second eccentric cylindrical hole, said second eccentric hole of said outer cylindrical body having a second eccentric hole longitudinal center axis that is parallel to and radially offset from a longitudinal center axis of said outer cylindrical body, said inner cylindrical body being radially supported in said second eccentric hole of said outer cylindrical body and rotatable therein so as to allow for adjustment of a radial distance of said cutting tool longitudinal center axis of the cutting tool from said principal axis;
    said third actuator including a first motor drivingly connected to said outer cylindrical body for individually rotating said outer cylindrical body about said longitudinal center axis of said outer cylindrical body, and a second motor drivingly connected to said inner cylindrical body for individually rotating said inner cylindrical body about said longitudinal center axis of said inner cylindrical body, said first motor and second motor being configured to rotate said outer cylindrical body and said inner cylindrical body in synchronism to maintain a mutual rotary position thereof so as to keep a radial offset position of the cutting tool unchanged during a working operation, said first motor and second motor being further configured to rotate said outer cylindrical body and said inner cylindrical body relative to each other so as to vary said radial offset position of the cutting tool;
    said third actuator further including a first rotating drive element coaxial to said outer cylindrical body and driven by said first motor, and a second rotating drive element coaxial to said outer cylindrical body and rotated by said second motor, said second drive element being rotatably connected to a carrier ring by way of two diametrically opposed, radial drive pins such that said carrier ring performs a radial sliding movement along a longitudinal axis of said drive pins relative to said second drive element while being rotated thereby, said carrier ring being connected to said inner cylindrical body by way of two diametrically opposed, radial carrier guide shafts, which are circumferentially spaced 90° from said drive pins, such that said inner cylindrical body performs a radial sliding movement relative to said carrier ring while being rotated thereby.

2. The orbital machining apparatus of claim 1, further including a belt wheel rotated by said second motor via an endless belt, said second drive element is coaxially connected to said belt wheel.

3. The orbital machining apparatus of claim 1, wherein said second drive element constitutes a yoke having two diametrically opposed, axially extending lugs guidingly supporting said carrier ring by way of said drive pins.

* * * * *